(12) United States Patent
Drinic et al.

(10) Patent No.: US 9,849,624 B2
(45) Date of Patent: Dec. 26, 2017

(54) FILM-EMBOSSING APPARATUS

(71) Applicant: LEONHARD KURZ Stiftung & Co. KG, Furth (DE)

(72) Inventors: Ljubisa Drinic, Nuremberg (DE); Michael Triepel, Furth (DE); Ralf Friedmann, Leutershausen-Erlbach (DE); Thomas Meier, Sulzbach-Rosenberg (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 162 days.

(21) Appl. No.: 14/774,339

(22) PCT Filed: Mar. 19, 2014

(86) PCT No.: PCT/EP2014/055543
§ 371 (c)(1),
(2) Date: Sep. 10, 2015

(87) PCT Pub. No.: WO2014/147146
PCT Pub. Date: Sep. 25, 2014

(65) Prior Publication Data
US 2016/0023398 A1    Jan. 28, 2016

(30) Foreign Application Priority Data

Mar. 22, 2013 (DE) .......................... 10 2013 102 984

(51) Int. Cl.
*B29C 59/00* (2006.01)
*B29C 59/04* (2006.01)
(Continued)

(52) U.S. Cl.
CPC .............. *B29C 59/04* (2013.01); *B29C 59/02* (2013.01); *B29C 63/0095* (2013.01);
(Continued)

(58) Field of Classification Search
CPC .... B29C 59/04; B29C 59/02; B29L 2007/001
(Continued)

(56) References Cited

U.S. PATENT DOCUMENTS

| | | | |
|---|---|---|---|
| 4,701,235 A * | 10/1987 | Mitsam | B44C 1/1729 156/233 |
| 4,802,949 A | 2/1989 | Mitsam | |
| 7,329,114 B2 * | 2/2008 | Harper | B29B 13/023 425/384 |
| 7,357,168 B2 | 4/2008 | Mitsam | |

(Continued)

FOREIGN PATENT DOCUMENTS

| | | |
|---|---|---|
| CN | 1646333 | 7/2005 |
| CN | 1915682 | 2/2007 |

(Continued)

*Primary Examiner* — Joseph S Del Sole
*Assistant Examiner* — Thu Khanh T. Nguyen
(74) *Attorney, Agent, or Firm* — Hoffmann & Baron, LLP

(57) ABSTRACT

A film-embossing apparatus with a hot-embossing device which has a heated embossing stamp. With the formation of a contact pressure, a transfer layer, arranged on a carrier film, of a hot-embossing film is transferred to a surface of a workpiece. The hot-embossing device has control inputs and outputs. The film-embossing apparatus has an industrial robot with control inputs and outputs. The control inputs and outputs of the hot-embossing device and of the industrial robot are connected to a control unit. The industrial robot is formed such that it guides the workpiece to the hot-embossing device, positions the workpiece on the embossing stamp, guides the workpiece past the embossing stamp, and guides the embossed workpiece away from the hot-embossing device. The industrial robot can also position the hot-embossing device on the workpiece.

19 Claims, 8 Drawing Sheets

(51) Int. Cl.
    *B32B 38/18*     (2006.01)
    *B29C 63/02*     (2006.01)
    *B29C 63/00*     (2006.01)
    *B29C 59/02*     (2006.01)
    *B32B 37/22*     (2006.01)
    *B32B 37/00*     (2006.01)
    *B29L 7/00*     (2006.01)

(52) U.S. Cl.
    CPC ........ *B29C 63/024* (2013.01); *B32B 38/1833* (2013.01); *B29L 2007/001* (2013.01); *B32B 37/025* (2013.01); *B32B 37/223* (2013.01); *B32B 38/1858* (2013.01); *B32B 2038/1891* (2013.01)

(58) Field of Classification Search
    USPC .................................................. 425/145, 385
    See application file for complete search history.

(56) References Cited

U.S. PATENT DOCUMENTS

| | | | |
|---|---|---|---|
| 7,540,933 | B2 | 6/2009 | Dugas et al. |
| 7,686,910 | B2 | 3/2010 | Habisreitinger et al. |
| 8,142,701 | B2 * | 3/2012 | Thallner ................ B82Y 10/00 |
| | | | 425/385 |
| 2004/0177917 | A1 | 9/2004 | Adachi |
| 2005/0022938 | A1 | 2/2005 | Masuda |
| 2005/0156342 | A1 | 7/2005 | Harper et al. |

FOREIGN PATENT DOCUMENTS

| | | |
|---|---|---|
| CN | 101432149 | 5/2009 |
| DE | 3210551 | 10/1983 |
| DE | 10159661 | 2/2003 |
| DE | 10339067 | 3/2005 |
| DE | 102005001693 | 9/2005 |
| EP | 0836933 | 4/1998 |
| EP | 1925426 | 5/2006 |
| EP | 2226183 | 9/2010 |
| WO | WO2007125508 | 11/2007 |

* cited by examiner

FILM-EMBOSSING APPARATUS

This application claims priority based on an International Application filed under the Patent Cooperation Treaty, PCT/EP2014/055543, filed on Mar. 19, 2014, and German Application No. DE 102013102984.1, filed on Mar. 22, 2013.

BACKGROUND OF THE INVENTION

The invention relates to a film-embossing apparatus according to the preamble of claim 1.

By means of a film-embossing apparatus a hot-embossing film is transferred to a surface of a workpiece to be decorated by means of an embossing wheel, wherein the process parameters embossing temperature, embossing pressure, embossing time have an influence on the quality of the hot embossing. The workpiece to be decorated can be, for example, a plastic workpiece.

In conventional hot embossing, a plastic workpiece is manually placed on a workpiece carrier adapted to the workpiece and clamped there. The workpiece holder with the clamped workpiece is then moved into an embossing position and embossed with the hot-embossing film.

A film-embossing apparatus of the named type is known from DE 101 59 661 C1.

The hot embossing of large workpieces along a three-dimensional contour with different angles of the embossing surfaces relative to each other in the hot-embossing roll-on method requires an embossing device formed specifically for the workpiece, with the result that differently formed workpieces cannot be decorated on one and the same embossing device.

SUMMARY OF THE INVENTION

The object of the present invention is to create an improved embossing device which is universally usable.

This object is achieved according to the invention with the subject of claim 1. A film-embossing apparatus is proposed for transferring a transfer layer, arranged on a carrier film, of a hot-embossing film to a surface of a workpiece with a hot-embossing device which has a heatable embossing stamp, wherein the hot-embossing device has control inputs and outputs, wherein it is provided that the film-embossing apparatus has an industrial robot with control inputs and outputs, that the control inputs and outputs of the hot-embossing device and of the industrial robot are connected to a control unit, and that the industrial robot is formed such that it guides the workpiece to the hot-embossing device, positions the workpiece on the embossing stamp and/or guides it along the embossing stamp, and guides the embossed workpiece away from the hot-embossing device, or guides the hot-embossing device to the workpiece, positions the embossing stamp on the workpiece and/or guides it along the workpiece, and guides the hot-embossing device away from the embossed workpiece.

The film-embossing apparatus according to the invention is characterized in that the adaptation of the apparatus to the workpiece to be embossed and/or to the hot-embossing film is essentially limited to the adaptation of control software for the hot-embossing device and/or the industrial robot. Through such an adaptation relating only to the software, the film-embossing apparatus can be adapted more flexibly to different geometries and/or embossing parameters. An alternative, previously known mechanical-structural adaptation of the film-embossing apparatus would be more expensive, in particular in the case of particularly complicated geometries to be embossed of workpieces or in the case of different workpieces to be embossed the geometries to be embossed of which differ markedly from each other.

The industrial robot can further be formed such that it detaches the transfer layer transferred to the workpiece from the carrier film.

An industrial robot is preferably formed of a device with an, in particular, arm-like manipulator, in particular a robotic arm. The industrial robot preferably further has a gripper and a control system. The movement paths of the manipulator and of the gripper are preferably freely programmable. An industrial robot can have one or more sensors which transmit signals to the control system. The industrial robot is further preferably designed such that it independently performs a programmed sequence of operations and/or also varies this within predefined limits, depending on items of sensor information. Such items of sensor information can, for example, be provided by distance sensors, movement sensors, sensors for temperature or pressure or light, or also e.g. by sensors which detect an end of the film and indicate that the film needs to be changed.

It can be provided that the hot-embossing device has a first film-guiding lever, arranged upstream of the embossing stamp, with a film-guiding roller, and a second film-guiding lever, arranged downstream of the embossing stamp, with a film-guiding roller, which cooperate with the industrial robot.

The film-guiding levers can be formed as swiveling levers which are mounted spring-loaded and/or the length of which can be adjusted. The swiveling levers can also be formed as pneumatically adjustable, electrically adjustable and/or hydraulically adjustable swiveling levers.

Alternatively it can be provided that the film-guiding levers are formed as swiveling levers which can be swiveled and/or the length of which can be adjusted by means of an electronically controllable adjustment apparatus. It is thus possible for the film-guiding levers to adopt positions which are dependent on the position of the workpiece predefined by the industrial robot, in order to make the hot-embossing film constantly rest against the workpiece in the area of the embossing stamp and of a cooling section described further below, downstream of the embossing stamp. An adaptation of the film-embossing apparatus to different workpiece geometries and/or different embossing parameters can thereby be achieved.

The film-guiding roller of the second film-guiding lever can act as a detachment edge, via which the carrier film detached from the transfer layer is guided away.

It can be provided that a detachment angle which lies in the range of from 8° to 135°, preferably from 10° to 90°, is formed between the carrier film and the transfer layer. It can be possible to set the detachment angle using the film-guiding lever and/or using external electronically controllable adjustment means. Depending on the embossing film used, the embossing parameters used or the workpiece material, the adaptation of the detachment angle can serve to improve the embossing quality. By means of the detachment angle it is determined how the carrier film detaches or separates from the applied transfer layer. It is essential that the already applied transfer layer is not damaged or detached again, and that edge areas do not or only slightly fray if the transfer layer is only applied over areas of surface.

It can further be provided that a cooling section is formed between the embossing stamp and the second film-guiding lever. When passing through the cooling section the transfer layer transferred to the workpiece cools until it firmly adheres to the surface of the workpiece and the detachment of the carrier film from the transfer layer does not bring about damage to the transfer layer. The cooling time depends above all on the length of the cooling section and on the feed rate of the workpiece.

It can be provided that the embossing stamp is formed as an embossing wheel. The embossing wheel can be formed with a smooth surface for transfer of the transfer layer over the whole surface. However, it is also possible to structure the surface of the embossing wheel such that only areas of the transfer layer are transferred. These areas can form a pattern, for example in the form of writing or a logo or a geometric shape. The embossing wheel can have a surface made of silicone, for example with a Shore hardness of from 30° Shore A to 100° Shore A, or made of metal, e.g. steel or brass.

It can be provided that the embossing wheel is formed such that it rotates synchronously with the feed motion of the hot-embossing film and the workpiece. The embossing wheel can have a controllable drive. However, it is also possible for it to be carried along over the hot-embossing film by the workpiece guided past.

The embossing stamp can also be formed as a plate-shaped embossing stamp. The plate-shaped embossing stamp can also be an embossing stamp with movable elements. The plate-shaped embossing stamp can have a surface made of silicone, for example with a Shore hardness of from 30° Shore A to 100° Shore A, or made of metal, e.g. steel or brass.

The industrial robot can have a robotic arm with 4 to 15 degrees of freedom, preferably with five to seven degrees of freedom.

The robotic arm can have a workpiece receiver.

It can be provided that the workpiece receiver is formed as a beam engaging with the workpiece. The contour of the workpiece receiver can be adapted to the workpiece.

The workpiece receiver can have vacuum suction cups which cooperate with the inner surface of the workpiece.

The workpiece receiver can further have clamping cylinders and/or workpiece ejectors which cooperate with the inner surface of the workpiece.

It can be provided that the workpiece receiver and/or the workpiece have or has guide elements and/or sensors which bring about a reproducible positional allocation between the workpiece receiver and the workpiece.

However, a workpiece receiver with movable elements which can be set corresponding to the workpiece contour can also be provided. Such a workpiece receiver can, for example, be formed as a gripper with gripper fingers.

It can also be provided that the hot-embossing device is arranged on the robotic arm. Such a design can be provided, for example, in order to decorate the front faces of plate-shaped workpieces. The workpieces can be guided to and away by means of a conveyor belt.

A positioning apparatus can be arranged on the robotic arm and/or on the hot-embossing device. The positioning apparatus can emit control signals for the industrial robot and/or the control unit. The positioning apparatus can, for example, be formed as an optical positioning apparatus which, for example, functions by means of a laser beam radiated onto the workpiece and reflected by it. However, it is also possible to use an image-acquisition system, e.g. a camera, with image-processing software, which can also be arranged separately.

The control unit can be formed as a central control unit. In this case the control unit functions as a so-called "master" and the hot-embossing apparatus and the industrial robot function as so-called "slaves". The "master" is the superordinated control unit, which gives commands for action to subordinated control units called "slaves" and queries whether the action has been carried out.

It is also possible for a separate control unit to be dispensed with and, instead of that, for the industrial robot or the hot-embossing device to function as "master". In these cases the control unit can be integrated into the industrial robot or the hot-embossing device. For example, the hot-embossing device can function as "master" in order to be particularly simple to adapt to different industrial robot types.

The control unit can be designed such that it controls the industrial robot such that during the embossing the workpiece is pressed onto the embossing stamp or vice versa with force that is constant at least in sections and/or at times. The amount of the force can be different in different sections of the workpiece.

It can be provided that a pressure sensor which is connected to the control unit is arranged on the robotic arm and/or on the workpiece receiver. The control unit or a control system of the industrial robot preferably has a regulator which, on the basis of the data received from the pressure sensor and optionally data received from other sensors, controls the robotic arm such that during the embossing the workpiece is pressed onto the embossing stamp with constant force.

Such a constant force is advantageous in order to keep the embossing conditions as a whole as constant as possible for a defined period of time, i.e. embossing force, embossing temperature, together with a constant feed rate of the workpiece and/or of the embossing stamp. However, it can likewise be advantageous to set different forces in sections depending on the workpiece geometry, for example because there are different surface qualities in sections on the workpiece or the embossing surface varies in sections. For example, it is advantageous to increase the embossing force if the surface to be embossed is comparatively large or to reduce the embossing force if the surface to be embossed is comparatively small. An example of this is an edge to be embossed of the workpiece, the width of which varies in sections.

A section of the workpiece surface, on which the embossing conditions and thus also the embossing force are to be kept constant, thus has in particular a uniform surface quality, for example roughness or material or radiation-absorbing capacity. Further, the embossing surface is preferably constant along this section.

It is further advantageous for the control unit to control the industrial robot such that during the embossing the workpiece is pressed onto the embossing stamp or vice versa with a force which is dependent on the surface quality and/or the size of the surface to be embossed of the workpiece or of the respective section to be embossed of the workpiece.

By a section of a workpiece in which, in particular, the force with which the workpiece is pressed against the embossing stamp or vice versa is constant is preferably meant a partial area of the surface of the workpiece in which the surface quality of the surface is constant in relation to one or more parameters, in particular is constant in relation to the surface roughness, material character of the surface and/or optical properties of the surface (e.g. absorptivity, color).

It is possible for a bus system which enables a permanent communication, including a target-actual comparison, between the individual control components to be used for the control-technology communication. A real-time control is thereby possible.

BRIEF DESCRIPTION OF THE DRAWINGS

The invention is now explained in more detail with reference to embodiment examples. There are shown in FIG. 1 a first embodiment example of the film-embossing apparatus according to the invention in a perspective representation.

DETAILED DESCRIPTION OF THE INVENTION

Figure 1:
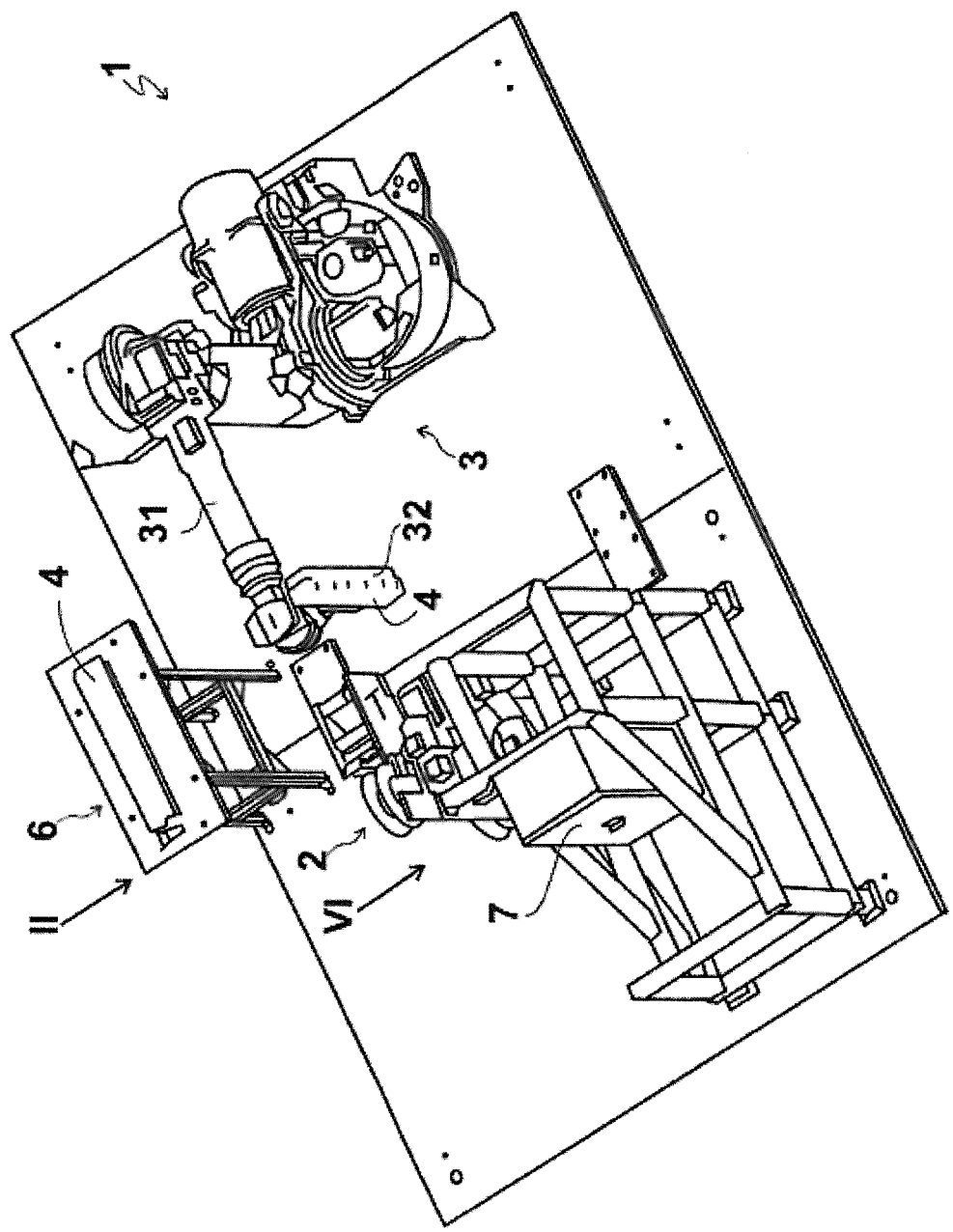
Figure 2:
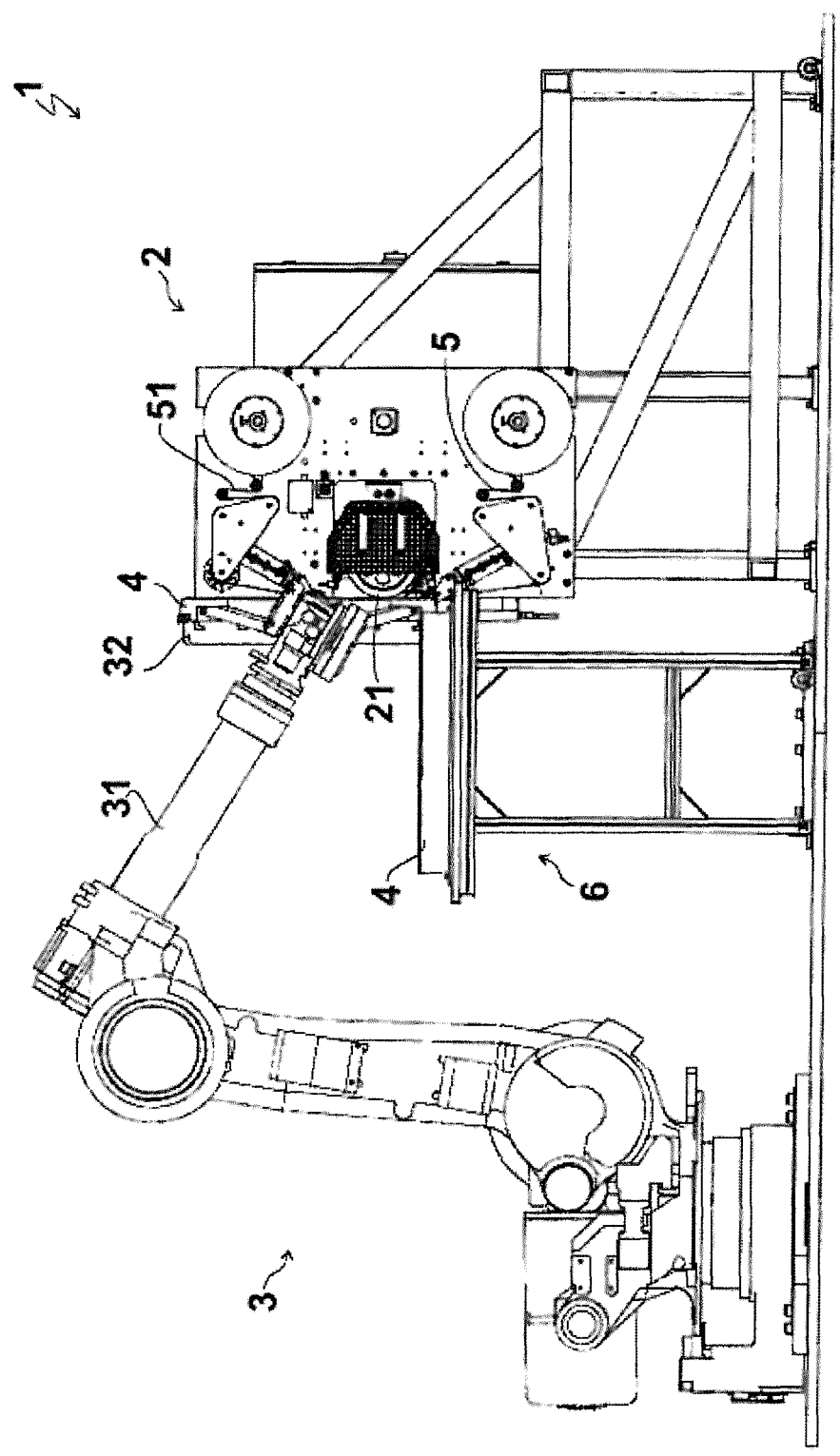
FIG. 2 the film-embossing apparatus in FIG. 1 in a front view in viewing direction II in FIG. 1.

FIGS. 1 and 2 show a film-embossing apparatus 1, comprising a hot-embossing device 2 and an industrial robot 3 which guides unembossed workpieces 4 from a bearing apparatus 6 to the hot-embossing device 2 and guides embossed workpieces 4 away from the hot-embossing device 2.

In the film-embossing apparatus 1 a transfer layer 51 (see FIG. 6) of a hot-embossing film 5 is transferred to the workpiece 4 at least in sections by means of a heated embossing stamp. The transfer layer 51 can be a decorative layer which can, for example, have the look and feel of a wood veneer. The transfer layer 51 is arranged on a carrier film 52. Further, a separation layer which makes it easier to detach the transfer layer 51 from the carrier film 52 can be arranged between the carrier film 52 and the transfer layer 51. The transfer layer 51 can in particular have several decorative layers, for example opaque or translucent or transparent color layers and/or metallized layers and/or optically variable layers. In addition, protective layers can be provided to increase the resistance of the transfer layer 51 to external influences and/or adhesion-promoter layers can be provided to improve the adhesion between other layers. The transfer layer 51 can additionally or alternatively have functional layers, in particular optically and/or electrically and/or electronically functional layers, e.g. made of metals, semiconductors or non-conducting layers. These functional layers can, for example, be electrical or electronic components, antenna elements, electrodes, photosensitive layers, light-emitting layers, radiation-polarizing layers, fluorescent layers, phosphorescent layers or the like. The decorative or functional layers can, for example, be formed of thermoplastic or radiation-curing polymers. The carrier film 52 can, for example, be made of polyethylene terephthalate (polyethylene terephthalate=PET) film, but can also be a transparent or partially transparent other plastic film, for example a film made of a polyolefin such as polyethylene (PE), polypropylene (PP), polyvinyl chloride (PVC), polystyrene (PS), polyester (PE) and/or polycarbonate (PC) or, for example, made of PMMA, polyamide or polyimide.

Figure 3:
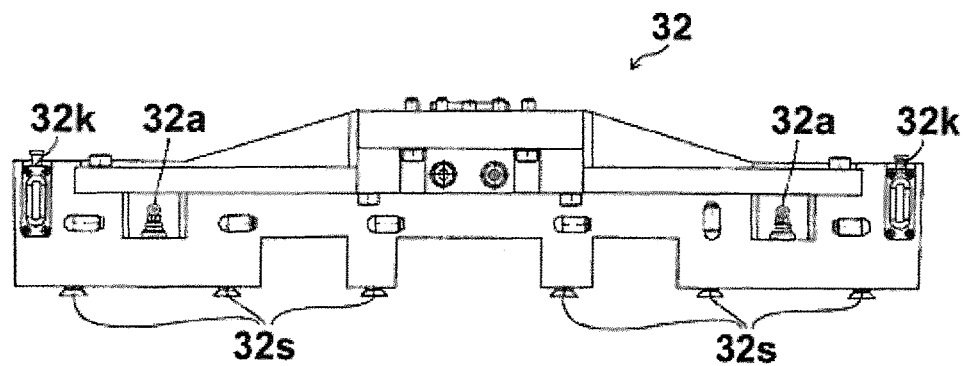
FIG. 3 the workpiece receiver in FIG. 1 in a front view.
Figure 4:
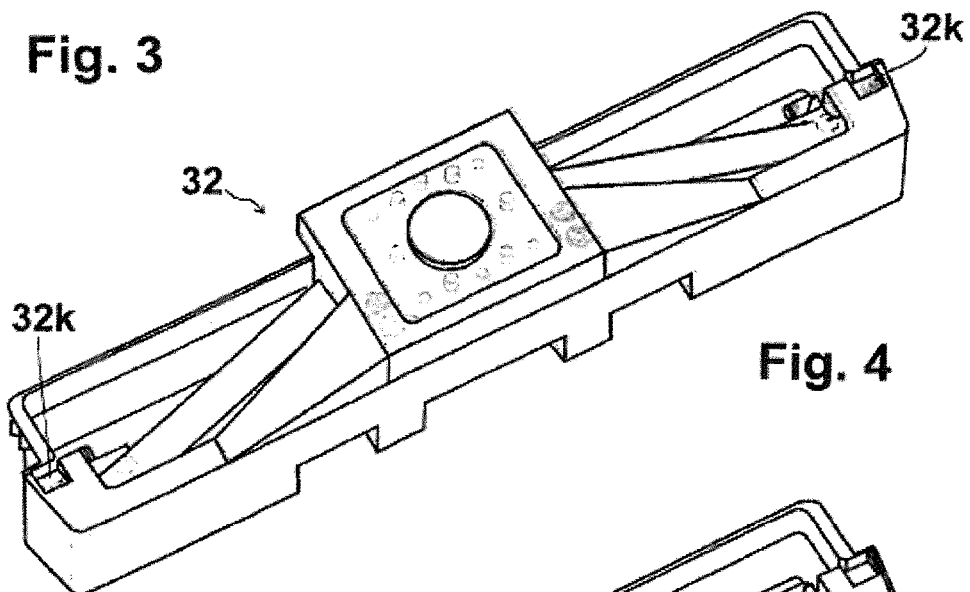
FIG. 4 the workpiece receiver in FIG. 3 in a perspective representation.
Figure 5:
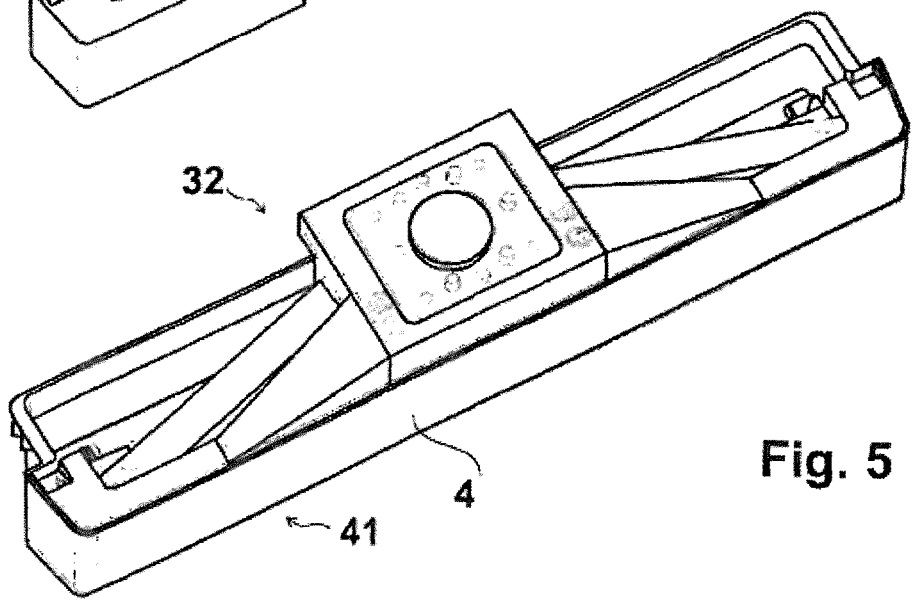
FIG. 5 the workpiece receiver in FIG. 4 with received workpiece in a perspective representation.

The industrial robot 3 has a robotic arm 31 which is movable in five degrees of freedom in the embodiment example represented. It is possible for the robotic arm 31 also to have more or fewer than five degrees of freedom. A workpiece receiver 32 is arranged on an end section of the transfer arm 31. The workpiece receiver 32 is formed as a beam, on which vacuum suction cups 32s, clamping cylinders 32k and workpiece ejectors 32a are arranged. FIGS. 3 and 4 show the workpiece receiver 32 in a location in which it can be placed on the workpiece 4 to grip the workpiece. FIG. 5 shows the workpiece receiver 32 with received workpiece 4, wherein the workpiece receiver is arranged in the workpiece 4 formed as a hollow shaped part. Suction is applied to the workpiece 4 by means of the vacuum suction cups 32s and it is clamped to the workpiece receiver 32 by means of the clamping cylinders 32k. The workpiece ejectors 32a detach the embossed workpiece 4 from the workpiece holder 32 again.

In the embodiment example represented in FIGS. 1 to 6 the hot-embossing device 2 is formed as a roller embossing apparatus in which the embossing stamp is formed as an embossing wheel 21. However a hot-embossing device with a plate-shaped embossing stamp can also be provided. The plate-shaped embossing stamp can also be an embossing stamp with movable elements.

The industrial robot 3 positions the workpiece 4 to be embossed, which can have a three-dimensional embossing surface, in all sections of the embossing surface such that the embossing surface is aligned parallel to the hot-embossing film 5 at least in sections and parallel to the circumference of the embossing wheel 21 at least in sections.

The industrial robot 3 presses the workpiece 4 onto the embossing wheel 21 and exerts an embossing force or produces an embossing pressure in the embossing surface. The embossing wheel 21 in the embodiment example represented acts as a rigid counter bearing. However, it is also possible for the embossing wheel 21 to be mounted spring-loaded, and thus it can recede slightly if necessary. In a further formation, the location and position of the embossing wheel 21 can be, automatically and/or manually, set hydraulically, pneumatically, electrically and/or mechanically, in order likewise to adapt to the sequence and the component geometry. The robotic arm 31 can preferably be formed with a force or pressure sensor and produce the embossing force by an infeed motion directed onto the embossing surface. The embossing force produced is preferably constant over a defined period of time or over a defined section of the workpiece surface, in order to create constant overall conditions together with the remaining embossing parameters temperature and feed rate of the workpiece. In turn, other constant conditions, which can also comprise a differently set constant embossing force, can be set on another, in particular neighboring, section or in another defined period of time.

Further, the industrial robot 3 guides the workpiece 4 past the embossing wheel 21, i.e. it carries out the feed motion of the workpiece 4.

The process parameters embossing temperature, embossing pressure or embossing force, embossing time or feed rate and cooling time have a substantial influence on the quality of the hot embossing.

The following value ranges of the three characteristic process parameters have proved their worth:
Embossing temperature: 160° C. to 220° C., preferably 190° C. to 210° C.
Embossing force: 600 N to 1600 N, preferably 900 N to 1200 N
Feed rate: 1.2 m/min to 6 m/min, preferably 3 m/min to 3.5 m/min After the embossing of the hot-embossing film 5 it is necessary to pass through a cooling section a (see FIG. 6). When passing through the cooling section a the transfer layer 51 of the hot-embossing film 5 transferred to the workpiece 4 cools until the transfer layer 51 can no longer be detached from the workpiece 4. The carrier film 52 can then be detached from the applied transfer layer 51 without loss of quality in the applied transfer layer 51.

Figure 6:
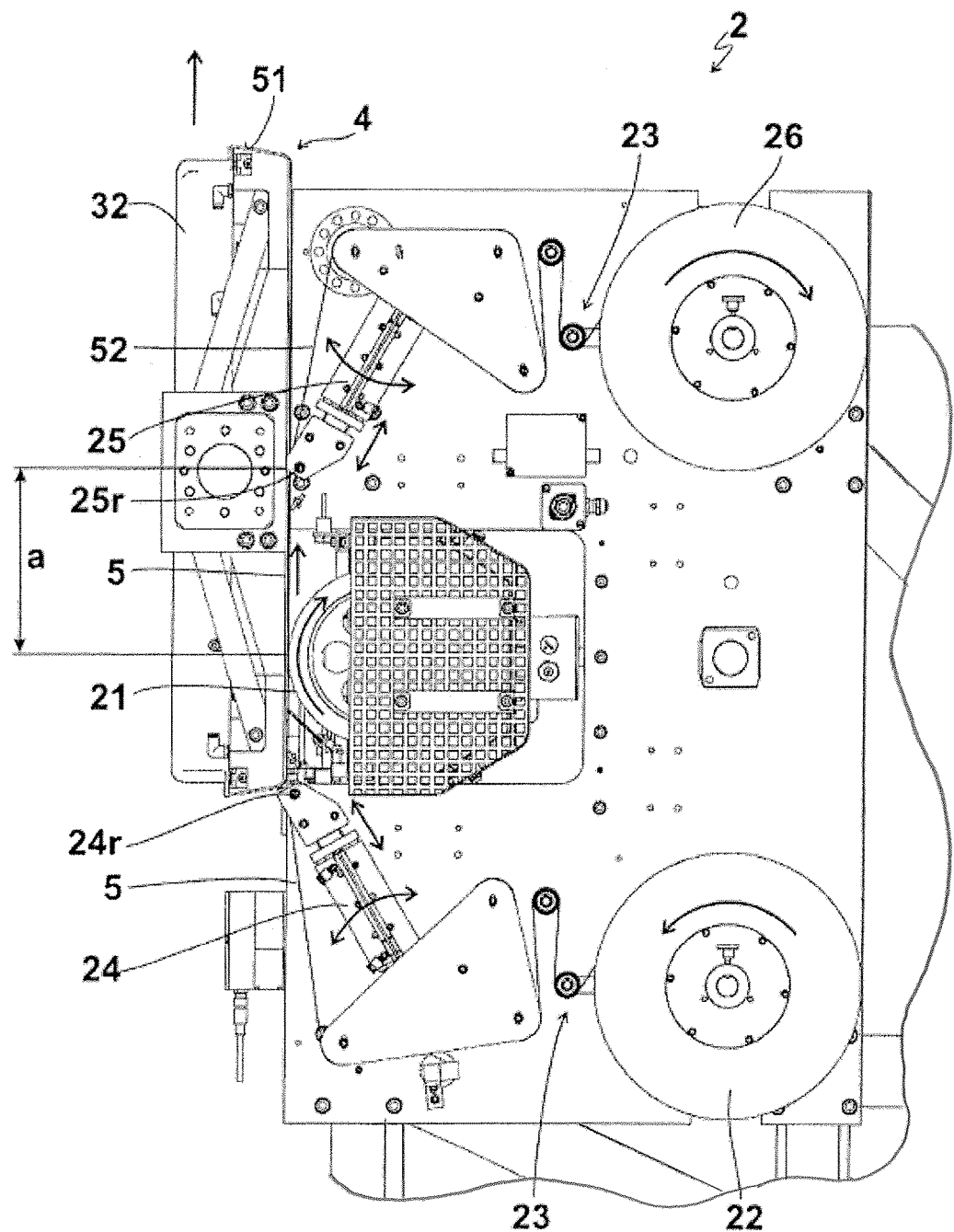
FIG. 6 the embossing unit in FIG. 1 in a front view in viewing direction VI in FIG. 1.

FIG. 6 shows the structure of the hot-embossing device 2 in detail.

The hot-embossing film 5 is arranged on a supply roller 22 and then passes through a first dancer roller 23. The dancer roller 23 is a device which keeps the film tension constant. The dancer roller 23 has a fixed deflection roller and a spring-loaded deflection roller around which the hot-embossing film 5 is looped in an S shape. A first film-guiding lever 24 is arranged downstream of the dancer roller 23. The film-guiding lever 24 is mounted swivelably at one of its end sections and at its other end section has one or more guide rollers 24r, over which the hot-embossing film 5, optionally with reference to the specifications, is guided. The length of the film-guiding lever 24 is adjustable, as indicated in FIG. 6 by a straight directional arrow.

The film-guiding lever 24 places the hot-embossing film 5 against the workpiece 4 even before the embossing wheel 21. The film-guiding lever 24 can be formed as a spring-loaded, pneumatically adjustable, electrically adjustable and/or hydraulically adjustable lever or can be swiveled and/or retracted and extended along its longitudinal axis by means of an electronically controllable adjustment apparatus. When traveling over curves the film-guiding lever 24 ensures that the hot-embossing film 5 rests and can be embossed around the complete corner radius of the workpiece 4 with corresponding leading and trailing sections.

The embossing wheel 21 is arranged downstream of the film-guiding lever 24. The heated embossing wheel 21 heats the hot-embossing film 5 guided through between the embossing wheel 21 and the workpiece 4, with the result that a thermoplastic adhesive applied to the transfer layer 51 is activated, and optionally an optional detachment layer between the carrier film 52 and the transfer layer 51 is activated and fixes the transfer layer 51 to the workpiece 4. If it is an unprofiled embossing wheel 21, the whole transfer layer 51 can be transferred to the workpiece 4, for example in order to decorate the edges of a panel. However, the transfer layer 51 can, however, also only partially transferred to the workpiece 4 if, for example, the edge on the workpiece 4 is somewhat narrower than the hot-embossing film 5, which can be advantageous in order to compensate for tolerances during the guiding of the hot-embossing film 5 to the embossing wheel 21. However, a profiled embossing wheel 21 can also be provided which transfers only areas of the transfer layer 51 to the workpiece 4. The transferred areas can, for example, form a pattern.

The circumferential speed of the embossing wheel 21 is identical in terms of amount to the feed rate of the hot-embossing film 5 and of the workpiece 4, i.e. the relative speed between the named components is equal to zero.

A second film-guiding lever 25 is arranged downstream of the embossing wheel 21. At a guide roller 25r of the second film-guiding lever 25 the carrier film 52 is detached from the transfer layer 51 transferred to the workpiece 4, wherein at the same time untransferred areas of the transfer layer 51 are detached. A detachment angle α which can, for example, be in the range of from 8° to 135°, preferably 10° to 90°, is formed between the carrier film 52 and the applied transfer layer 51. The detachment angle α to be set can depend on the material properties and/or the feed rate of the hot-embossing film 5. The distance between the guide roller 25r and a linear contact area formed between the embossing wheel 21 and the hot-embossing film 5 forms the cooling section a described further above.

A second dancer roller 23 and a take-up roller 26 are arranged downstream of the second film-guiding lever 25.

An electronic control unit 7 is provided to control the hot-embossing device 2 and the industrial robot 3. The control unit 7 can, for example, be arranged on the hot-embossing device 2, as represented in FIG. 1.

The control unit 7 implements the following procedure:
a) The industrial robot 3 travels into a receiving position and, by means of the vacuum suction cups 32s and the clamping cylinders 32k, grips unembossed workpiece 4 provided in the bearing apparatus 6.
b) The industrial robot 3 travels, with the workpiece 4, up to the hot-embossing device 2 and embosses the workpiece 4, in a travel over the embossing contour, with embossing force that is constant at least in sections or at times, along the predefined workpiece contour on the heated embossing wheel 21.
c) During the travel over the embossing contour the two film-guiding levers 24 are moved such that both when traveling over curves and when traveling over flat surfaces the hot-embossing film 5 rests against the workpiece 4 at all times, leading up to and trailing the embossing.
d) After the embossing the industrial robot 3 with the workpiece 4, against which the hot-embossing film 5 rests, starts the cooling section a.
e) At the end of the cooling section the carrier film 52 is detached from the transfer layer 51 transferred to the workpiece 4.
f) The industrial robot 3 travels into a depositing position and separates the embossed workpiece 4 from the workpiece receiver 32:
the clamping cylinders 32k are retracted,
the vacuum suction cups 32s are switched off,
the workpiece ejectors 32a press the workpiece 4 away from the workpiece receiver 32.
g) The industrial robot 3 travels back into its starting position.

The communication of the individual operating states can take place via the control inputs and outputs of the industrial robot 3 and the hot-embossing device 2.

Figure 7:
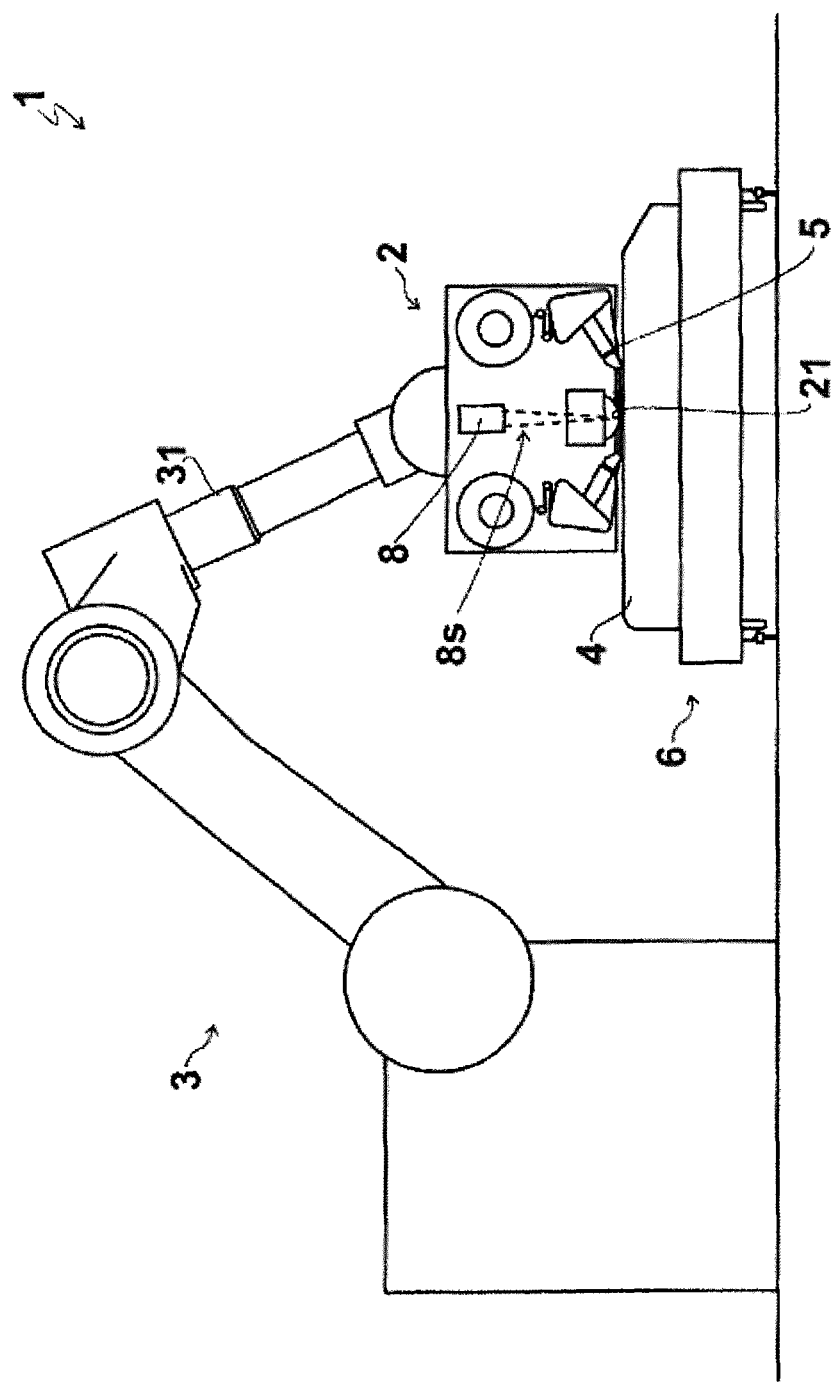
FIG. 7 a second embodiment example of the film-embossing apparatus according to the invention in a schematic representation.

FIG. 7 shows a second embodiment example of the film-embossing device 1, in which the hot-embossing device 2 is arranged on the robotic arm 31 and the embossing wheel 21 is pressed onto the workpiece 4 which is arranged on the bearing apparatus 6 formed as a transport and bearing apparatus.

A positioning apparatus 8 is arranged on the hot-embossing device 2 for the positionally-accurate positioning of the hot-embossing device 2 in relation to the workpiece 3. The workpiece 4 can be a plate-shaped workpiece, the edge area of which is decorated with the transfer layer of the hot-embossing film 5. The positioning apparatus 8 can emit control signals for the industrial robot 3 and/or the control unit 7.

The positioning apparatus 8 in the example represented in FIG. 7 is formed as an optical positioning apparatus. The beam emitting from the positioning apparatus 8 and reflected by the workpiece 4 is labelled 8s. It can be a laser beam. The positioning apparatus 8 can also be arranged on the robotic arm 31 or integrated into the robotic arm. If it is an imaging positioning apparatus, the positioning apparatus 8 can also be formed as a separate apparatus which is, for example, assembled such that it detects, by imaging, the industrial robot 3 and the bearing apparatus 6.

However, the positioning can likewise be implemented in terms of control technology via the spatial coordinates in the working area of the industrial robot 3.

Figure 8:
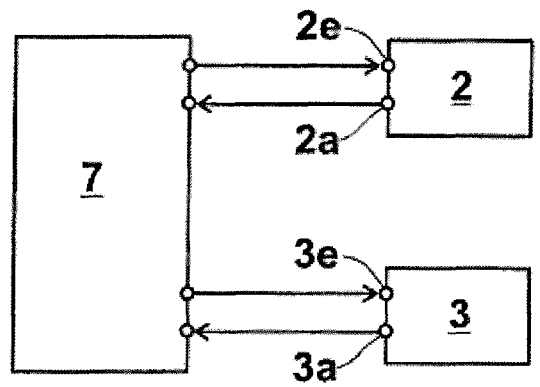
FIG. 8 a block diagram of a first embodiment example of a control unit of the film-embossing apparatus in FIG. 1.

FIG. 8 shows a block diagram of a first embodiment example of a control unit 7.

The control unit 7 is formed as a central control unit. The hot-embossing device 2 and the industrial robot 3 are connected to the control unit 7 via control inputs 2e or 3e and control outputs 2a or 3a. By programming of the control unit 7 the film-embossing apparatus 1 can, for example, be set to the geometry of the workpiece 4 and the material properties of the hot-embossing film 5. The control unit 7 functions as a so-called "master" and the hot-embossing device 2 and the industrial robot 3 function as so-called "slaves". The "master" is the superordinated control unit, which gives commands for action to subordinated control units called "slaves" and queries whether the action has been carried out.

Figure 9:
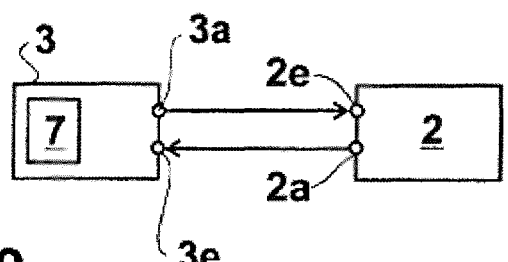
FIG. 9 a block diagram of a second embodiment example of a control unit of the film-embossing apparatus in FIG. 1.
Figure 10:
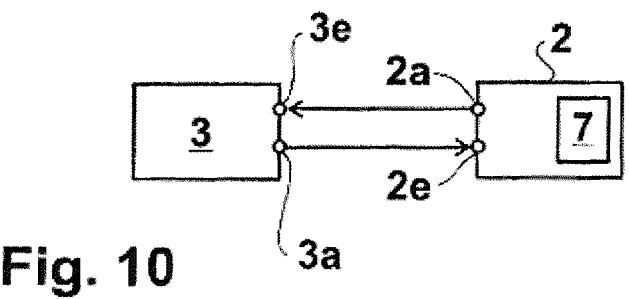
FIG. 10 a block diagram of a third embodiment example of a control unit of the film-embossing apparatus in FIG. 1.

It is also possible for a separate control unit to be dispensed with and, instead of that, for the industrial robot 3 or the hot-embossing device 2 to function as "master". In these cases the control unit 7 is integrated into the industrial robot 3 or the hot-embossing device 2, as FIGS. 9 and 10 show.

Figure 11:
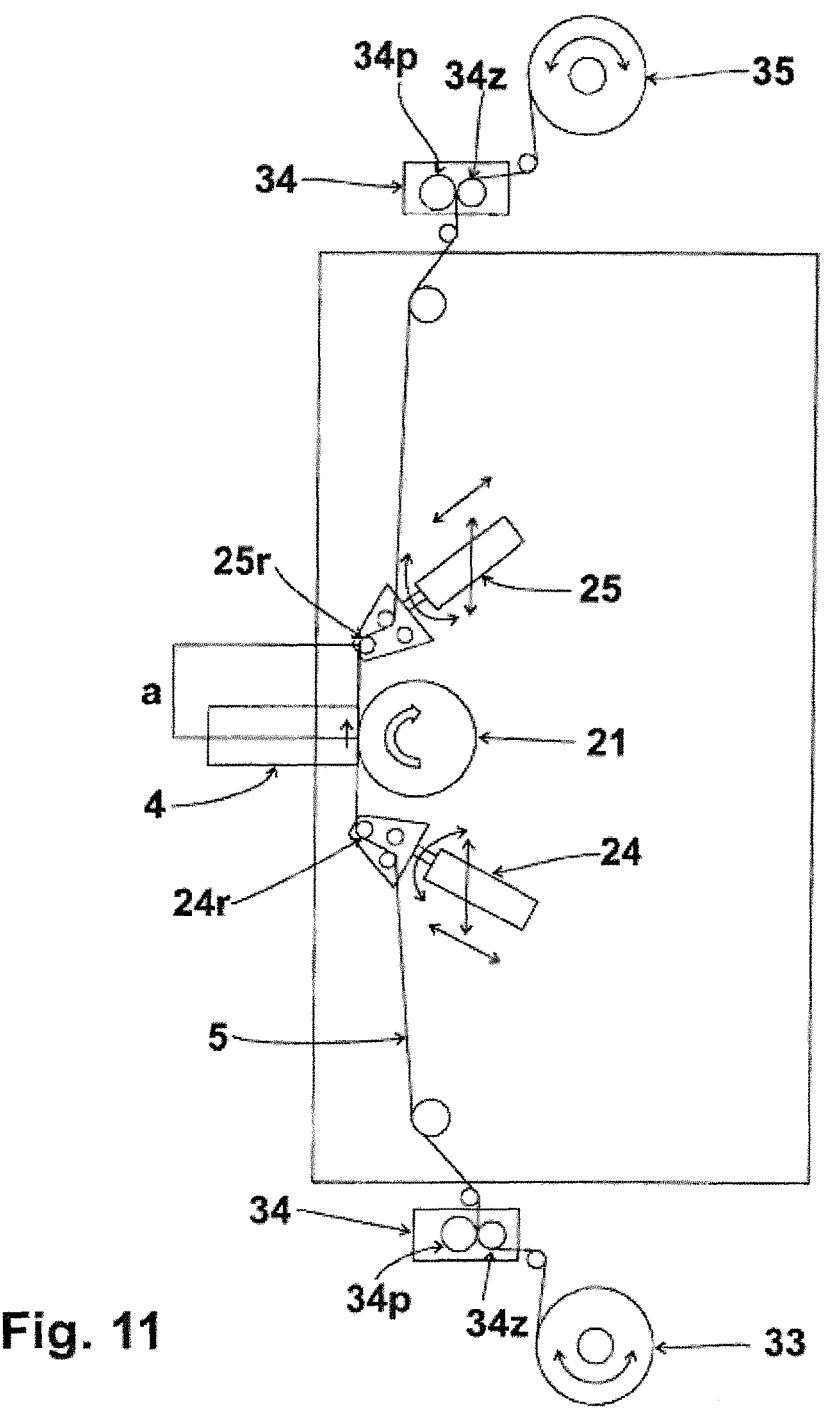
FIG. 11 a first schematic representation of an embossing unit with tension mechanism and without dancer rollers.

FIG. 11 shows an optional schematic structure of the hot-embossing device 2 in detail.

The hot-embossing film 5 is arranged on a feed roller 33 and then passes through the first tension mechanism 34. The tension mechanism 34 is a device which keeps the film tension constant, or enables a forward and or backward winding of the hot-embossing film 5. The tension mechanism 34 has an adjustable press roller 34p and a drawing roller 34z which are driven via a belt drive which is connected to a motor. A first film-guiding lever 24 is arranged downstream of the tension mechanism 34. The film-guiding lever 24 is mounted swivelably at one of its end sections and at its other end section has one or more guide rollers 24r, over which the hot-embossing film 5, optionally with reference to the respective specifications, for example the respective geometry of the parts, is guided. The length of the film-guiding lever 24 is adjustable, as indicated in FIG. 6 by a straight directional arrow.

The film-guiding lever 24 places the hot-embossing film 5 against the workpiece 4 even before the embossing wheel 21. The film-guiding lever 24 can be formed as a spring-loaded, pneumatically adjustable, electrically adjustable and/or hydraulically adjustable lever or can be swiveled and/or retracted and extended along its longitudinal axis by means of an electronically controllable adjustment apparatus. When traveling over curves the film-guiding lever 24 ensures that the hot-embossing film 5 rests and can be embossed around the complete corner radius of the workpiece 4 with corresponding leading and trailing sections.

The embossing wheel 21 is arranged downstream of the film-guiding lever 24. The heated embossing wheel 21 heats the hot-embossing film 5 guided through between the embossing wheel 21 and the workpiece 4, with the result that a thermoplastic adhesive applied to the transfer layer 51 is activated, and optionally an optional detachment layer between the carrier film 52 and the transfer layer 51 is activated and the transfer layer 51 is fixed to the workpiece 4. If it is an unprofiled embossing wheel 21, the whole transfer layer 51 can be transferred to the workpiece 4, for example in order to decorate the edges of a panel. However, the transfer layer 51 can, however, also only be partially transferred to the workpiece 4 if, for example, the edge on the workpiece 4 is somewhat narrower than the hot-embossing film 5, which can be advantageous in order to compensate for tolerances during the guiding of the hot-embossing film 5 to the embossing wheel 21. However, a profiled embossing wheel 21 can also be provided which transfers only areas of the transfer layer 51 to the workpiece 4. The transferred areas can, for example, form a pattern.

The circumferential speed of the embossing wheel 21 is identical in terms of amount to the feed rate of the hot-embossing film 5 and of the workpiece 4, i.e. the relative speed between the named components is equal to zero.

A second film-guiding lever 25 is arranged downstream of the embossing wheel 21. At a guide roller 25r of the second film-guiding lever 25 the carrier film 52 is detached from the transfer layer 51 transferred to the workpiece 4, wherein at the same time untransferred areas of the transfer layer 51 are detached. A detachment angle α which can, for example, lie in the range of from 8° to 135°, preferably 10° to 90°, is formed between the carrier film 52 and the applied transfer layer 51. The detachment angle α to be set can depend on the material properties and/or the feed rate of the hot-embossing film 5. The distance between the guide roller 25r and a linear contact area formed between the embossing wheel 21 and the hot-embossing film 5 forms the cooling section a described further above.

A second tension mechanism 34 and a take-up roller 35 are arranged downstream of the second film-guiding lever 25.

The dancer rollers 23 are replaced by tension mechanisms 34 in FIG. 11. Dancer rollers are usually not adjustable. The desired tension is set a single time via the mechanical suspension of the dancer roller. The tension mechanisms 34, in contrast, are finely adjustable electronically in respect of tensile force and optionally also in terms of the progression of the force over time. It has been shown that in particular during embossing of round workpieces 4 the cooling section of the film 5 on the part is not sufficient. During the embossing of round parts there is only a line contact between embossing wheel 21 and workpiece. If the film 5 is tensioned by the dancer rollers 23, then the film 5 detaches almost directly after the line contact, whereby there is practically no cooling section and the embossing suffers. If the film tension is reduced manually, the film 5 remains suspended practically loose on the embossed workpiece 4 as a loop and a cooling section forms. Only after a while does the film 5 detach, almost by itself, from the workpiece 4. This can be controlled by the tension mechanism, i.e. the film tension is varied over time in order that this cooling section forms in the best possible manner depending on the geometry of the parts.

Above all the second tension mechanism 34 is decisive (during take-up). The first tension mechanism in the film guide is only optional and could be replaced by a dancer roller. The fine control is less important here.

Figure 12:
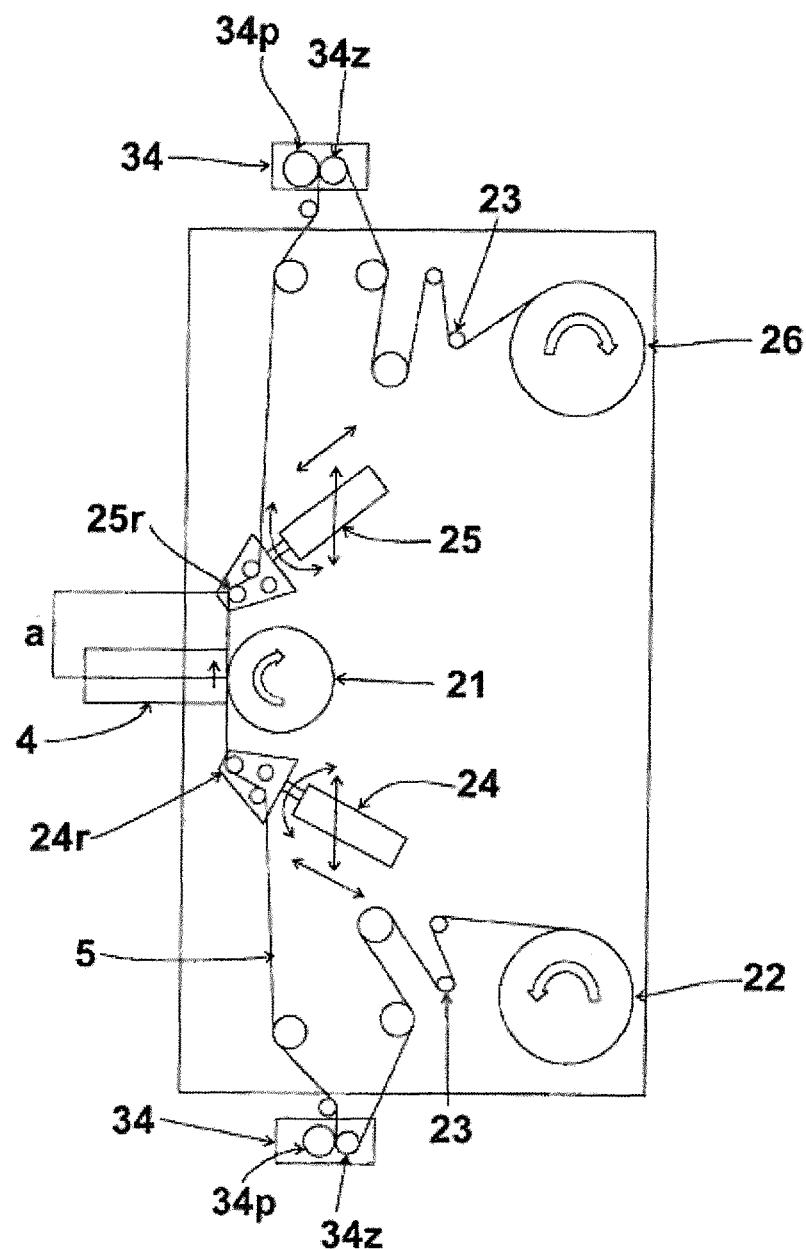
FIG. 12 a second schematic representation of an embossing unit with tension mechanism and with dancer rollers.

FIG. 12 shows a further optional schematic structure of the hot-embossing device 2 in detail.

The hot-embossing film 5 is arranged on a supply roller 22 and then passes through a first dancer roller 23. The dancer roller 23 is a device which keeps the film tension constant. The dancer roller 23 has a fixed deflection roller and a spring-loaded deflection roller around which the hot-embossing film 5 is looped in an S shape. The first tension mechanism 34 is arranged downstream of the dancer roller 23. The tension mechanism 34 is a device which keeps the film tension constant, or enables a forward and or backward winding of the hot-embossing film 5. The tension mechanism 34 has an adjustable press roller 34p and a drawing roller 34z which is driven via a belt drive which is connected to a motor. A first film-guiding lever 24 is arranged downstream of the tension mechanism 34. The film-guiding lever 24 is mounted swivelably at one of its end sections and at its other end section has one or more guide rollers 24r, over which the hot-embossing film 5, optionally with reference to the specifications, is guided. The length of the film-guiding lever 24 is adjustable, as indicated in FIG. 6 by a straight directional arrow.

The film-guiding lever 24 places the hot-embossing film 5 on the workpiece 4 even before the embossing wheel 21. The film-guiding lever 24 can be formed as a spring-loaded, pneumatically adjustable, electrically adjustable and/or hydraulically adjustable lever or can be swiveled and/or retracted and extended along its longitudinal axis by means of an electronically controllable adjustment apparatus. When traveling over curves the film-guiding lever 24 ensures that the hot-embossing film 5 rests and can be embossed around the complete corner radius of the workpiece 4 with corresponding leading and trailing sections.

The embossing wheel 21 is arranged downstream of the film-guiding lever 24. The heated embossing wheel 21 heats the hot-embossing film 5 guided through between the embossing wheel 21 and the workpiece 4, with the result that a thermoplastic adhesive applied to the transfer layer 51 is activated, optionally an optional detachment layer between the carrier film 52 and the transfer layer 51 is activated and the transfer layer 51 is fixed to the workpiece 4. If it is an unprofiled embossing wheel 21, the whole transfer layer 51 can be transferred to the workpiece 4, for example in order to decorate the edges of a panel. However, the transfer layer 51 can, however, also only be partially transferred to the workpiece 4 if, for example, the edge on the workpiece 4 is somewhat narrower than the hot-embossing film 5, which can be advantageous in order to compensate for tolerances during the guiding of the hot-embossing film 5 to the embossing wheel 21. However, a profiled embossing wheel 21 can also be provided which transfers only areas of the transfer layer 51 to the workpiece 4. The transferred areas can, for example, form a pattern.

The circumferential speed of the embossing wheel 21 is identical in terms of amount to the feed rate of the hot-embossing film 5 and of the workpiece 4, i.e. the relative speed between the named components is equal to zero.

A second film-guiding lever 25 is arranged downstream of the embossing wheel 21. At a guide roller 25r of the second film-guiding lever 25 the carrier film 52 is detached from the transfer layer 51 transferred to the workpiece 4, wherein at the same time untransferred areas of the transfer layer 51 are detached. A detachment angle α which can, for example, lie in the range of from 8° to 135°, preferably 10° to 90°, is formed between the carrier film 52 and the applied transfer layer 51. The detachment angle α to be set can depend on the material properties and/or the feed rate of the hot-embossing film 5. The distance between the guide roller 25r and a linear contact area formed between the embossing wheel 21 and the hot-embossing film 5 forms the cooling section a described further above.

A second tension mechanism 34, a second dancer roller 23 and a take-up roller 26 are arranged downstream of the second film-guiding lever 25.

It is possible for a bus system which enables a permanent communication, including a target-actual comparison, between the individual control components to be used for the control-technology communication. The movement of the embossing wheel 21, the hot-embossing film 5, the robotic arm 31 and the guiding lever 24r can thereby be coordinated in real time.

LIST OF REFERENCE NUMBERS

1 Film-embossing apparatus
2 Hot-embossing device
2a Control output
2e Control input
3 Industrial robot
3a Control output
3e Control input
4 Workpiece
5 Hot-embossing film
6 Bearing apparatus
7 Control unit
8 Positioning apparatus
8s Optical beam
21 Embossing wheel
22 Supply roller
23 Dancer roller
24 First film-guiding lever
24r Guide roller
25 Second film-guiding lever
25r Guide roller
26 Take-up roller
31 Robotic arm
32 Workpiece receiver
32a Workpiece ejector
32k Clamping cylinder
32s Vacuum suction cup
33 Feed roller (supply roller)
34 Tension mechanism
34p Press roller
34z Drawing roller
35 Take-up roller
51 Transfer layer
52 Carrier film
a Cooling section
α Detachment angle

The invention claimed is:

1. A film-embossing apparatus for transferring a transfer layer
arranged on a carrier film, of a hot-embossing film to a surface of a workpiece with a hot-embossing device which has a heatable embossing stamp,
wherein the hot-embossing device has control inputs and outputs, and wherein the film-embossing apparatus has an industrial robot with control inputs and outputs, and wherein the control inputs and outputs of the hot-embossing device and of the industrial robot are connected to a control unit, and wherein the industrial robot is formed such that it:
guides the workpiece to the hot-embossing device,
positions the workpiece on the embossing stamp or guides it along the embossing stamp, and
guides the embossed workpiece away from the hot-embossing device, and wherein the hot-embossing device has a first film-guiding lever with a first film-guiding roller, arranged upstream of the embossing stamp, and a second film guiding lever with a second film-guiding roller, arranged downstream of the embossing stamp, the first and second film-guiding levers cooperating with the industrial robot, and wherein the industrial robot is further adapted to detach the carrier film from the transfer layer transferred to the workpiece.

2. A film-embossing apparatus according to claim 1, wherein the film-guiding levers are formed as swiveling levers which are mounted spring-loaded and/or the length of which can be adjusted.

3. A film-embossing apparatus according to claim 1, wherein the film-guiding levers are formed as swiveling levers which can be swiveled and/or the length of which can be adjusted by means of an electronically controllable adjustment apparatus.

4. A film-embossing apparatus according to claim 1, wherein the film-guiding roller of the second film-guiding lever acts as a detachment edge, via which the carrier film detached from the transfer layer is guided away.

5. A film-embossing apparatus according to claim 4, wherein a detachment angle which lies in the range of from 8° to 135°, is formed between the carrier film and the transfer layer.

6. A film-embossing apparatus according to claim 1, wherein the embossing stamp is formed as an embossing wheel.

7. A film-embossing apparatus according to claim 6, wherein the embossing wheel is formed such that it rotates synchronously with the feed motion of the hot-embossing film and the workpiece.

8. A film-embossing device according to claim 1, wherein a cooling section is formed between the embossing stamp and the second film-guiding lever.

9. A film-embossing apparatus according to claim 1, wherein the industrial robot has a robotic arm with 4 to 15 degrees of freedom.

10. A film-embossing apparatus according to claim 9, wherein the robotic arm has a workpiece receiver to receive the workpiece.

11. A film-embossing apparatus according to claim 10, wherein the workpiece receiver comprises a beam engaging with the workpiece.

12. A film-embossing apparatus according to claim 10, wherein the workpiece receiver has vacuum suction cups which cooperate with the inner surface of the workpiece.

13. A film-embossing apparatus according to claim 10, wherein the workpiece receiver has clamping cylinders and/or workpiece ejectors which cooperate with the inner surface of the workpiece.

14. A film-embossing apparatus according to claim 10, wherein the workpiece receiver and/or the workpiece have or has guide elements and/or sensors which bring about a reproducible positional allocation between the workpiece receiver and the workpiece.

15. A film-embossing apparatus according to claim 1, wherein a positioning apparatus is arranged on the robotic arm and/or on the hot-embossing device.

16. A film-embossing apparatus according to claim 1, wherein the control unit is designed such that it controls the industrial robot such that, during the embossing, the workpiece is pressed onto the embossing stamp or vice versa with force that is constant at least in sections and/or at times.

17. Film-embossing apparatus according to claim 16, wherein a pressure sensor which is connected to the control unit is arranged on the robotic arm and/or on the workpiece receiver.

18. A film-embossing apparatus for transferring a transfer layer
arranged on a carrier film, of a hot-embossing film to a surface of a workpiece with a hot-embossing device which has a heatable embossing stamp,
wherein the hot-embossing device has control inputs and outputs, and
wherein the film-embossing apparatus has an industrial robot with control inputs and outputs, and
wherein the control inputs and outputs of the hot-embossing device and of the industrial robot are connected to a control unit, and
wherein the industrial robot is formed such that it:
guides the hot-embossing device to the workpiece;
positions the embossing stamp on the workpiece or guides it along the workpiece; and
guides the hot-embossing device away from the embossed workpiece, and
wherein the hot-embossing device has a first film-guiding lever with a first film-guiding roller, arranged upstream of the embossing stamp, and a second film-guiding lever with a second film-guiding roller, arranged downstream of the embossing stamp, the first and second film-guiding levers cooperating with the industrial robot, and
wherein the industrial robot is further adapted to detach the carrier film from the transfer layer transferred to the workpiece.

19. A film-embossing apparatus according to claim 18, wherein the industrial robot is further formed such that it detaches the carrier film from the transfer layer transferred to the workpiece.

* * * * *